United States Patent [19]

Yamasaki

[11] Patent Number: 5,025,894
[45] Date of Patent: Jun. 25, 1991

[54] PARALLEL AXIS GEAR SET AND ELEVATOR HOIST EMPLOYING THE SAME

[75] Inventor: Shinzi Yamasaki, Inazawa, Japan

[73] Assignee: Mitsubishi Denki Kabushiki Kaisha, Japan

[21] Appl. No.: 609,066

[22] Filed: Oct. 31, 1990

Related U.S. Application Data

[63] Continuation of Ser. No. 301,106, Jan. 25, 1989, abandoned.

[30] Foreign Application Priority Data

Jan. 27, 1988 [JP] Japan ................... 63-16237

[51] Int. Cl.[5] .................. B66B 11/04; F16H 55/18
[52] U.S. Cl. ........................ 187/20; 74/409; 74/440
[58] Field of Search ................ 74/409, 440; 187/17–27

[56] References Cited

U.S. PATENT DOCUMENTS

| | | | |
|---|---|---|---|
| 3,174,356 | 3/1965 | Michalec | 74/440 |
| 3,496,794 | 2/1970 | Forichon | 74/440 |
| 4,189,951 | 2/1980 | Sauter | 74/440 |
| 4,433,755 | 2/1984 | Ohtomi | 187/20 |
| 4,526,252 | 7/1985 | Hirano . | |
| 4,569,423 | 2/1986 | Hirano | 187/20 |
| 4,747,321 | 5/1988 | Hannel | 74/440 |
| 4,846,309 | 7/1989 | Nara et al. | 187/20 |

FOREIGN PATENT DOCUMENTS 57-51686  3/1982  Japan .
57-141383 9/1982  Japan .
59-74972  11/1982 Japan .

Primary Examiner—Michael S. Huppert
Assistant Examiner—Kenneth R. DeRosa
Attorney, Agent, or Firm—Leydig, Voit & Mayer

[57] ABSTRACT

A parallel axis gear set has a first gear, a second gear in engagement with the first gear, and a third gear coaxially rotatable relative to the first gear and in engagement with the second gear. The third gear is in frictional engagement with the first gear, and the third gear includes a plurality of teeth having a tooth thickness larger than that of the second gear or the first gear. The meshing depth between the first gear and the second gear is greater than the meshing depth between the third gear and the second gear. An elevator hoist apparatus employing the gear set is also disclosed.

13 Claims, 3 Drawing Sheets

PARALLEL AXIS GEAR SET AND ELEVATOR HOIST EMPLOYING THE SAME

This application is a continuation of application Ser. No. 07/301,160, filed Jan. 25, 1989 now abandoned.

BACKGROUND OF THE INVENTION

This invention relates to a gear set and more particularly to a parallel axis gear set in which shocks and noise due to the backlash between gears is reduced. It also relates to an elevator hoist employing such a parallel axis gear set.

A conventional elevator hoist apparatus has a speed reduction gear connected between an electric motor and a hoist drum. The speed reduction gear generally is a parallel axis speed reduction gear having a first spur gear and a second spur gear in engagement with the first gear. The first gear has a first shaft connected to the motor, and the second gear has a second shaft parallel to the first shaft and connected to the hoist drum.

The hoist drum has a plurality of elevator main ropes wound therearound. An elevator car is connected to one end of the main ropes and a counterweight is connected to the other end of the main ropes. When the elevator car is to be selectively moved upward or downward or stopped or started within the hoistway, the speed and the direction of rotation of the drum is changed. Since the elevator car and the counterweight are connected to the opposite ends of the main ropes, they move in opposite directions relative to each other.

When the elevator car is started and accelerated from a complete stop to a predetermined constant speed or decelerated to serve at a floor, or when the direction of movement of the car is changed at the ends of the hoistway, the rotational speed or direction of the input shaft and therefore the speed of the driving gear of the speed reduction gear must be changed. Upon such a change in the rotation of the speed of the driving gear, the gear teeth of the driving gear hit the gear teeth of the driven gear due to backlash between the driving teeth and the driven teeth. This also takes place when the load on the elevator car and the counterweight balance each other and when the load on the car changes.

Such hitting between the driving and driven gear teeth due to backlash is disadvantageous in that the shocks and noise are generated in the speed reduction gear, and the precise positioning of the elevator car at the landing cannot be realized. Particularly, when shocks are generated between the driving and driven gears due to backlash the shocks are transmitted through the main ropes to the elevator car significantly degrading the comfort of the passengers in the elevator car.

SUMMARY OF THE INVENTION

Accordingly, one object of the present invention is to provide a parallel axis gear set in which the backlash can be substantially absorbed.

Another object of the present invention is to provide a parallel axis gear set in which shocks and noise which are generated by impact between the driving and driven gears due to backlash therebetween are alleviated.

Still another object of the present invention is to provide a parallel axis gear set which is suitable for use in a speed reduction gear in an elevator hoist apparatus.

A further object of the present invention is to provide an elevator hoist apparatus having a parallel axis speed reduction gear in which noise and shocks due to backlash between the gears in the speed reduction gear is decreased.

With a above objects in view the parallel axis gear set of the present invention includes a first gear, a second gear in which meshes with the first gear, and a third gear coaxially rotatable relative to the first gear and meshing with the second gear. The third gear is in frictional engagement with the first gear and includes a plurality of teeth having a tooth thickness larger than that of the second gear or the first gear. The meshing depth between the first gear and the second gear is greater than the meshing depth between the third gear and the second gear.

An elevator hoist apparatus according to the present invention comprises a motor, a hoist drum and a parallel axis gear set. The parallel axis gear set comprises a first gear having a first shaft connected to the motor, a second gear which meshes with the first gear and having a second shaft connected to the hoist drum, and a third gear coaxially rotatable relative to the first gear and meshing with the second gear. The third gear is in frictional engagement with the first gear and includes a plurality of teeth having a tooth thickness larger than that of the second gear or the first gear, and the meshing depth between the first gear and the second gear is greater than the meshing depth between the third gear and the second gear.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
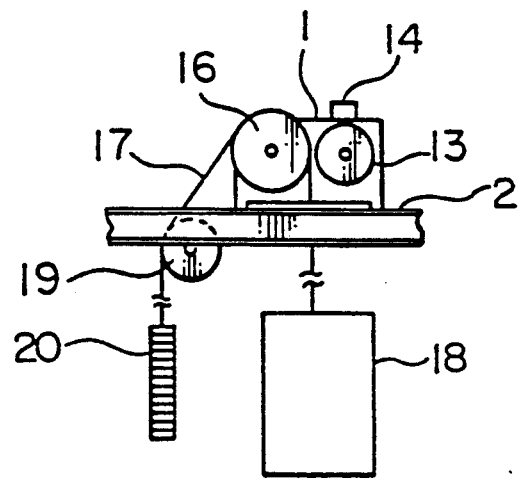
FIG. 1 is a general side view of an elevator hoist apparatus to which the parallel axis gear set of the present invention is applicable.
Figure 2:
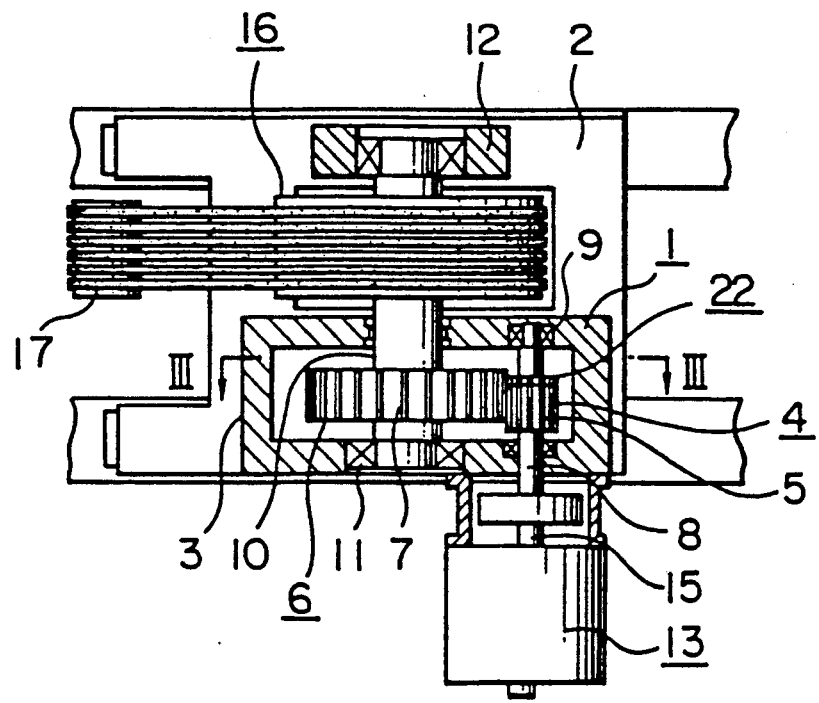
FIG. 2 is a vertical sectional view of the elevator hoist apparatus shown in FIG. 1.

FIG. 1 and 2 illustrate an elevator hoist apparatus of the present invention. As shown in these figures, it includes a parallel axis speed reduction gear unit 1 mounted on a machine bed 2. The speed reduction gear unit 1 comprises a housing 3 in which a first gear 4 having a plurality of gear teeth 5 and a second gear 6 having a plurality of gear teeth 7 in engagement with the first gear 4 are disposed. The first gear 4 is mounted on a first shaft 8 rotatably supported by bearing 9 mounted in the housing 3, and the second gear 6 is mounted on a second shaft 10 rotatably supported by a pair of bearings 11 mounted in the housing 3 and a pedestal 12 mounted on the machine bed 2. In the illustrated embodiment, the first and the second gears 4 and 6 are spur gears rotatable about their respective axes which are parallel to each other.

The elevator hoist apparatus also comprises an electric motor 13 with a brake mechanism 14 (see FIG. 1) mounted on the housing 3 of the speed reduction gear unit 1. The motor 13 has a shaft 15 connected to the first shaft 8 of the speed reduction gear unit 1 to drive it as an input shaft. The second shaft 10 of the second gear 6 extends outwardly from the housing 3 and has mounted thereon a hoist drum 16 around which a plurality of main ropes 17 are wound. One end of each main rope 17 is connected to and supports an elevator car 18 and the other end of each main rope 17 passes over the deflection sheave 19 rotatably mounted to the machine bed 2 and is connected to a counterweight 20 to support it.

Figure 3:
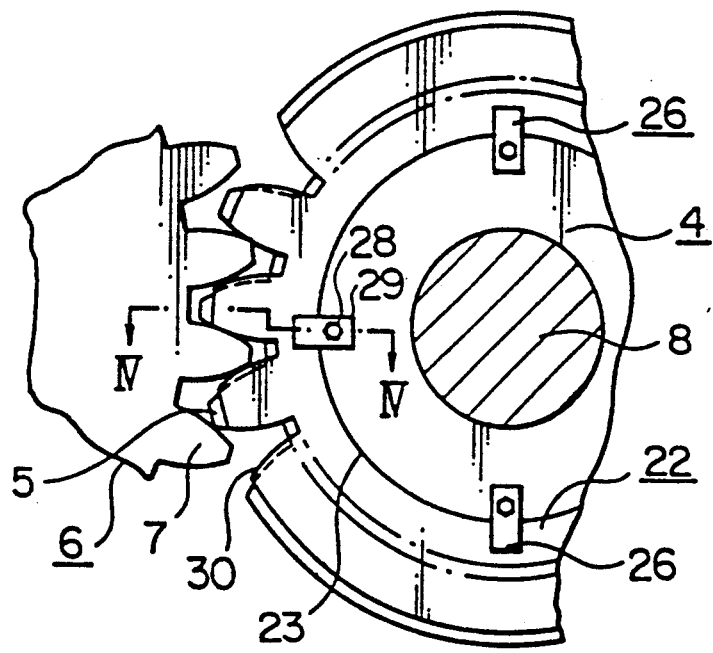
FIG. 3 is a fragmental plan view of the parallel axis gear set of the present invention taken along line III—III of FIG. 2.
Figure 4:
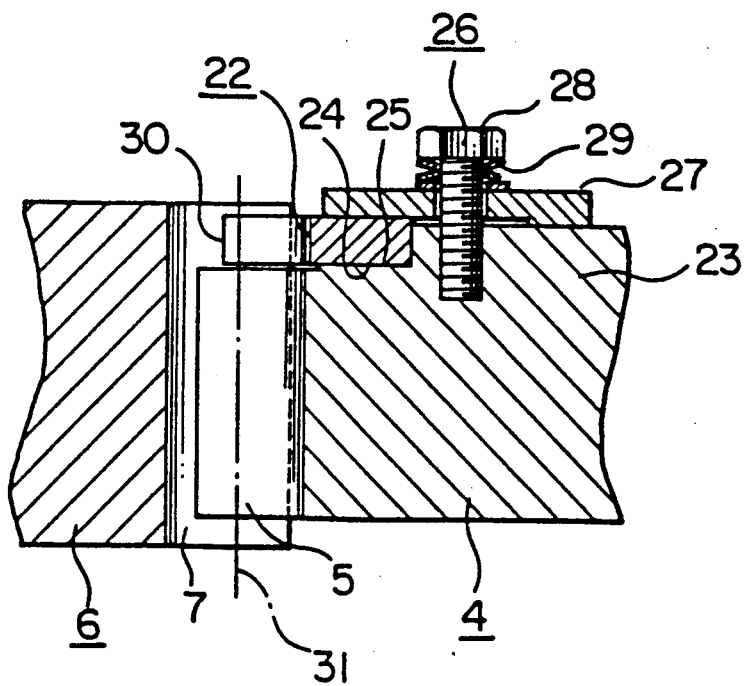
FIG. 4 is a fragmental sectional view of the parallel axis gear set of the present invention taken along line IV—IV of FIG. 3.

According to the present invention, the parallel axis speed reduction gear 1 of the elevator hoist apparatus further comprises a third gear 22 in addition to the first and the second gears 4 and 6. As best shown in FIGS. 3 and 4, the third gear 22 is a relatively thin ring gear mounted on a circular raised protion 23 formed on one side of the first gear 4 so as to be coaxially rotatable relative to the first gear 4. The third gear 22 is placed on the first gear 4 with its side surface 24 in frictional contact with a side surface 25 of the first gear 4. In order to ensure that frictional contact is established between the first and the third gears 4 and 22, spring-biased gear holder assemblies 26 for applying a contact pressure to the frictional contacting side surfaces 24 and 25 are provided. The gear holder assembly 26 comprises a holder piece 27 bridging the raised portion 23 of the first gear 4 and the annular third gear 22, a bolt 28 which loosely, extends through the holder piece 27 and screws into the first gear 4, and spring washers 29 disposed between the head of the bolt 28 and the holder piece 27.

The third gear 22 is preferably made of a ceramic material such as aluminum oxide ($Al_2O_3$), silicon nitride ($Si_3N_4$), silicon carbide (SiC), zirconium oxide ($ZrO_2$), etc. The third gear 22 may have a frictional engagement surface 24 made of the above materials. Alternatively, the third gear 22 may be made of a suitable wear-resistant metal.

Figure 5:
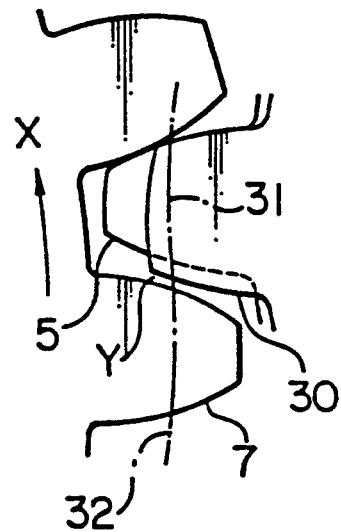
FIG. 5 to 7 are enlarged diagrams showing the interrelationships between the teeth of the first, second and third gears of the parallel axis gear set of the present invention, illustrating how they absorb shocks due to backlash between the gear teeth.
Figure 6:
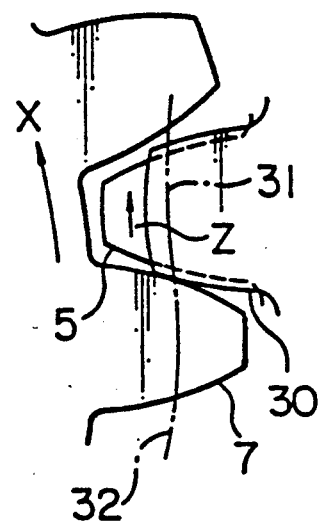
Figure 7:
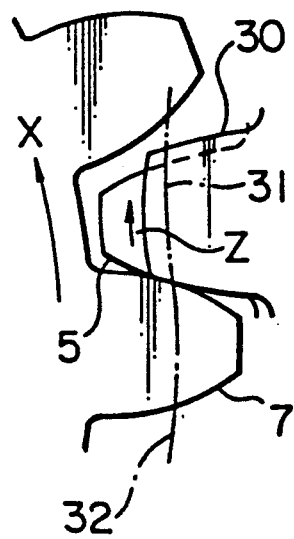

In FIGS. 5 to 7, it is seen that the third gear 22 includes a plurality of teeth, 30 in engagement with the teeth 7 of the second gear 6 and that each of the teeth 30 has a tooth thickness, i.e., a circumferential dimension at a pitch circle 31 of the first and the third gears 4 and 22 greater than that of the teeth 7 of the second gear 6. Furthermore, as shown in FIGS. 5-7, the tooth thickness of the third gear 22 is greater than that of the first gear 4 along the pitch circle 31 of the first and third gears 4 and 22. The second gear 6 has a pitch circle 32 which is equal to the pitch circle 31 of the first and the third gears 4 and 22. The meshing depth between the first gear 4 and the second gear 6 is greater than the meshing depth between the third gear 22 and the second gear 6. In other words, the first gear 4 and the third gear 22 have the same pitch circle 31, but the adendum circle or the outer diameter of the third gear 22 is smaller than that of the first gear 4.

When the second gear 6 is rotated counterclockwise as shown by arrow X in a state in which the first, second and third gears 4, 6 and 22, respectively, are positioned as shown in FIG. 5, tooth 7 of the second gear 6 first contacts and pushes tooth 30 of the third gear 22 at a point Y corresponding to the pitch circle 31 or 32. Then, as shown in FIG. 6, the third gear 22 is rotated clockwise as shown by arrow Z relative to the first gear tooth 5 against the friction between them until the first gear tooth 5 and the third gear tooth 30 reach the position shown in FIG. 7 in which the second gear tooth 7 contacts not only with the third gear tooth 30 but also with the first gear tooth 5. In this position, the first gear 4 is now being driven by the second gear 6.

During the movement of the gears 6 and 22 from their positions shown in FIG. 5 to the positions shown in FIG. 7 against the friction between two gears 6 and 22, the energy of the movement of the second gear is absorbed by the friction between the first and the third gears 4 and 22. Therefore, the shock generated when the second gear tooth 7 hits the first gear tooth 5 due to backlash between these two teeth 7 and 5 is significantly reduced, whereby shocks and vibrations transmitted to the elevator car are greatly decreased.

As has been described, the parallel axis gear set of the present invention comprises a first gear, a second gear in engagement with the first gear, and a third gear coaxially rotatable relative to the first gear and in engagement with the second gear. The third gear is in frictional engagement with the first gear, and the third gear includes a plurality of teeth having a tooth thickness larger than that of the second gear or the first gear. The meshing depth between the first gear and the second gear is greater than the meshing depth between the third gear and the second gear. Therefore, in the gear set of the present invention, shocks and vibrations generated by impact between the gear teeth of the gear set due to backlash can be significantly decreased. This gear set is particularly suitable for use in a speed reduction gear unit of an elevator hoist apparatus in that the shocks, vibrations, and noise generated by the backlash between the gears felt by passengers in an elevator car are greatly decreased.

Conventional anti-backlash gear sets employ adjacent, coaxially mounted gears having identical dimensions, i.e., gears having identical tooth widths and meshing depths. Backlash is prevented by counter-rotating the adjacent gears so that the teeth of the adjacent gears are slightly offset with respect to one another. In a conventional anti-backlash gear set, since the adjacent gears have identical dimensions, it is necessary to dispose some mechanical device, such as a spring, between adjacent gears to produce the counter-rotation.

However, because the first and third gears 4 and 22 of a gear set according to the present invention have different dimensions, the teeth of gears 44 and 22 are automatically offset with respect to one another without the need to dispose a spring or other mechanical device therebetween. Therefore, a gear set according to the present invention has a simpler structure than a conventional anti-backlash gear set and can be manufactured more economically. Furthermore, since there is no mechanical device subject to breakage disposed between the first and third gears 4 and 22, a gear set according to the present invention is more reliable than a conventional anti-backlash gear set.

What is claimed is:

1. A gear set comprising:
   a first gear having a lateral surface and a plurality of teeth;
   a second gear having a plurality of teeth and meshing with said first gear; and
   a third gear coaxially rotatable relative to said first gear and having a plurality of teeth meshing with said second gear and having a lateral surface in frictional engagement with the lateral surface of said first gear, the tooth thickness of said third gear being greater than the tooth thickness of said first gear.

2. A gear set as claimed in claim 1 wherein said first gear and said third gear have a common pitch circle, and the tooth thickness of said third gear is greater than the tooth thickness of said first gear along said pitch circle.

3. A gear set as claimed in claim 1 wherein the meshing depth between said first gear and said second gear is greater than the meshing depth between said third gear and said second gear.

4. A gear set comprising:
a first gear having a lateral surface and a plurality of teeth;
a second gear having a plurality of teeth and meshing with said first gear; and
a third gear coaxially rotatable relative to said first gear and having a plurality of teeth meshing with said second gear and having a lateral surface in frictional engagement with the lateral surface of said first gear, the meshing depth between said first gear and said second gear being greater than the meshing depth between said third gear and said second gear.

5. A gear set as claimed in claim 4 wherein said first gear and said third gear have a common pitch circle, and said first gear has an adendum circle greater than the adedum circle of the third gear.

6. A gear set comprising:
a first gear having a lateral surface and a plurality of teeth;
a second gear having a plurality of teeth and meshing with said first gear; and
a third gear coaxially rotatable relative to said first gear and having a plurality of teeth meshing with said second gear and having a lateral surface in frictional engagement with the lateral surface of said first gear, the meshing depth between said first gear and said second gear being greater than the meshing depth between said third gear and said second gear, and the tooth thickness of said third gear being greater than the tooth thickness of said first gear.

7. A gear set comprising:
a first gear having a lateral surface;
a second gear meshing with said first gear; and
a third gear coaxially rotatable relative to said first gear and meshing with said second gear and having a lateral surface in frictional engagement with the lateral surface of said first gear, said third gear including a plurality of teeth having a tooth thickness larger than that of said second gear, the meshing depth between said first gear and said second gear being greater than the meshing depth between said third gear and said second gear.

8. A gear set as claimed in claim 7 wherein said first gear has a raised portion formed on its lateral surface, and said third gear is a ring gear which is mounted on said raised portion.

9. A gear set as claimed in claim 7 further comprising a gear holder assembly for resiliently pressing the lateral surface of said third gear against the lateral surface of said first gear.

10. A gear set as claimed in claim 9, wherein the lateral surface of said third gear is made of a material selected from aluminum oxide, silicon nitride, silicon carbide, and zirconium oxide.

11. An elevator hoist comprising:
a motor;
a hoist drum; and
a gear set comprising:
a first gear having a first shaft connected to said motor and a lateral surface;
a second gear meshing with said first gear and having a second shaft connected to said hoist drum; and
a third gear coaxially rotatable relative to said first gear and meshing with said second gear and having a lateral surface in frictional engagement with the lateral surface of said first gear, said third gear including a plurality of teeth having a tooth thickness larger than that of said first gear, the meshing depth between said first gear and said second gear being greater than the meshing depth between said third gear and said second gear.

12. An elevator hoist as claimed in claim 11 further comprising a gear holder assembly for resiliently pressing the lateral surface of said third gear against the lateral surface of said first gear.

13. An elevator hoist as claimed in claim 11, wherein the lateral surface of said third gear is made of a material selected from aluminum oxide, silicon nitride, silicon carbide, and zirconium oxide.

* * * * *